(12) United States Patent
Meldrum et al.

(10) Patent No.: US 8,901,501 B2
(45) Date of Patent: Dec. 2, 2014

(54) SCINTILLATION DETECTION DEVICE WITH AN ENCAPSULATED SCINTILLATOR

(71) Applicants: Daniel Meldrum, Painesville, OH (US); Jeremy Flamanc, Rungis (FR)

(72) Inventors: Daniel Meldrum, Painesville, OH (US); Jeremy Flamanc, Rungis (FR)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 61 days.

(21) Appl. No.: 13/730,877

(22) Filed: Dec. 29, 2012

(65) Prior Publication Data

US 2013/0200265 A1    Aug. 8, 2013

Related U.S. Application Data

(60) Provisional application No. 61/582,221, filed on Dec. 30, 2011.

(51) Int. Cl.
*G01T 1/20* (2006.01)
*E21B 47/10* (2012.01)

(52) U.S. Cl.
CPC ........... *G01T 1/2002* (2013.01); *E21B 47/1015* (2013.01); *G01T 1/2006* (2013.01)
USPC .................................................. 250/361 R

(58) Field of Classification Search
CPC .......................................................... G01T 1/20
USPC ....................................................... 250/361 R
See application file for complete search history.

(56) References Cited

U.S. PATENT DOCUMENTS

| 3,426,195 | A  | * | 2/1969  | Menefee et al. ............ 250/485.1 |
| 4,004,151 | A  |   | 1/1977  | Novak        |
| 6,563,120 | B1 |   | 5/2003  | Baldwin et al. |
| 6,898,265 | B1 |   | 5/2005  | Mliner et al. |
| 7,126,148 | B2 |   | 10/2006 | Murray et al. |
| 7,202,456 | B2 |   | 4/2007  | Mickael      |
| 7,633,058 | B2 |   | 12/2009 | Stoller et al. |
| 2010/0163735 | A1 | | 7/2010  | Menge et al. |
| 2010/0193690 | A1 | | 8/2010  | Hunt et al.  |
| 2010/0276600 | A1 | | 11/2010 | Ronda et al. |

FOREIGN PATENT DOCUMENTS

WO    95-23983 A1    9/1995
WO    2010125292 A1    11/2010

OTHER PUBLICATIONS

International Search Report for PCT/US2012/072208 dated Apr. 25, 2013, 3 pgs.
Functionalproducts, Capcure Lof, Cognis., <www.cognis.com>, Revision No. effective Feb. 7, 2008, dated Sep. 3, 2009, 3 pages.
Safety Data Sheet according to applicable EC directive, Huntsman, Ident-No. ARALDITE CY 221, Version 1, Revision date May 20, 2008, Print date May 28, 2008, 7 pages.
Vantico, Electronic Polymers, Encapsulating Systems, Vantico Ltd, Araldite Casting Resin System, Araldite CY 221/HY 2966, dated Jul. 2000, 6 pages.

* cited by examiner

*Primary Examiner* — David Porta
*Assistant Examiner* — Hugh H Maupin
(74) *Attorney, Agent, or Firm* — Abel Law Group, LLP; Robert N. Young

(57) ABSTRACT

A scintillation device is disclosed and can include a scintillator and a pliable encapsulating barrier completely surrounding the scintillator. The scintillation device can be used within a detector device. The detector device can include a housing and a photosensor within the housing. The scintillation device can be within the housing adjacent to the photosensor.

20 Claims, 5 Drawing Sheets

SCINTILLATION DETECTION DEVICE WITH AN ENCAPSULATED SCINTILLATOR

CROSS-REFERENCE TO RELATED APPLICATION

This application claims priority under 35 U.S.C. §119(e) to U.S. patent application Ser. No. 61/582,221 entitled "Scintillation Detection Device with an Encapsulated Scintillator," by Meldrum et al., filed Dec. 30, 2011, which is assigned to the current assignee hereof and incorporated herein by reference in its entirety.

FIELD OF THE DISCLOSURE

The present disclosure is directed to scintillation detectors, particularly to scintillation detection devices with encapsulated scintillators.

DESCRIPTION OF THE RELATED ART

Scintillation detectors have been employed in various industrial applications, such as the oil and gas industry for well logging. Typically, these detectors have scintillator crystals made of certain materials effective for detecting various types of radiation, including for example, gamma rays. Generally, the scintillator crystals are enclosed in tubes or casings, which include a window permitting radiation induced scintillation light to pass out of the crystal package for measurement by a light-sensing device such as a photomultiplier tube. The photomultiplier tube converts the light photons emitted from the crystal into electrical pulses that are shaped and digitized by associated electronics that can be registered as counts and transmitted to analyzing equipment.

In terms of well logging applications, the ability to detect gamma rays makes it possible to analyze rock strata as gamma rays are emitted from naturally occurring radioisotopes, typically of shales that surround hydrocarbon reservoirs. In such applications, the environments to which the scintillation detectors are exposed can be substantially harsh. For example, such environments can be extremely aqueous. Direct exposure to water can render the scintillation material within a scintillation detector inoperable.

Accordingly, the industry continues to need improvements in scintillation devices, particularly scintillation devices that can withstand the aqueous environments of certain industrial applications.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to scintillation detection devices, and particularly, to scintillation detection devices having encapsulated scintillator crystals. For example, the scintillation detection devices of embodiments herein can be used in downhole exploration and well logging.

The description discloses the use of an encapsulating barrier, such as an epoxy coating or a pliable material, to completely encapsulate a scintillator crystal within a scintillation detection device. The encapsulating barrier is well suited for a scintillator that is hygroscopic and will be part of a detector that is exposed to a harsh environment. The epoxy encapsulated scintillator crystal can be utilized within a scintillation detection device that is placed inside a sonde. The sonde can be generally tubular and can be reeled down a hole in order to detect gamma rays. The use of the sonde in such a manner makes it possible to analyze rock strata as gamma rays are emitted from naturally occurring radioisotopes, typically of shales that surround hydrocarbon reservoirs. Various features of a well logging system, a sonde, and scintillation detection devices are described in more detail herein.

According to a one aspect, a sonde is disclosed that includes a scintillator material such as, a scintillator crystal. The scintillator material can be sensitive to particular types of radiation, for example, gamma rays, such that when the material is struck by a particular type of radiation, the scintillator responds by fluorescing or scintillating electromagnetic radiation at a particular wavelength. The fluoresced radiation can be captured and recorded by a photosensor, such as a photomultiplier tube, which converts the fluoresced radiation to an electrical signal for processing. As such, the detector can provide a user with the ability to detect and record radiation events, which in the context of well logging applications, can enable users to determine the composition rock strata surrounding a borehole.

Figure 1:
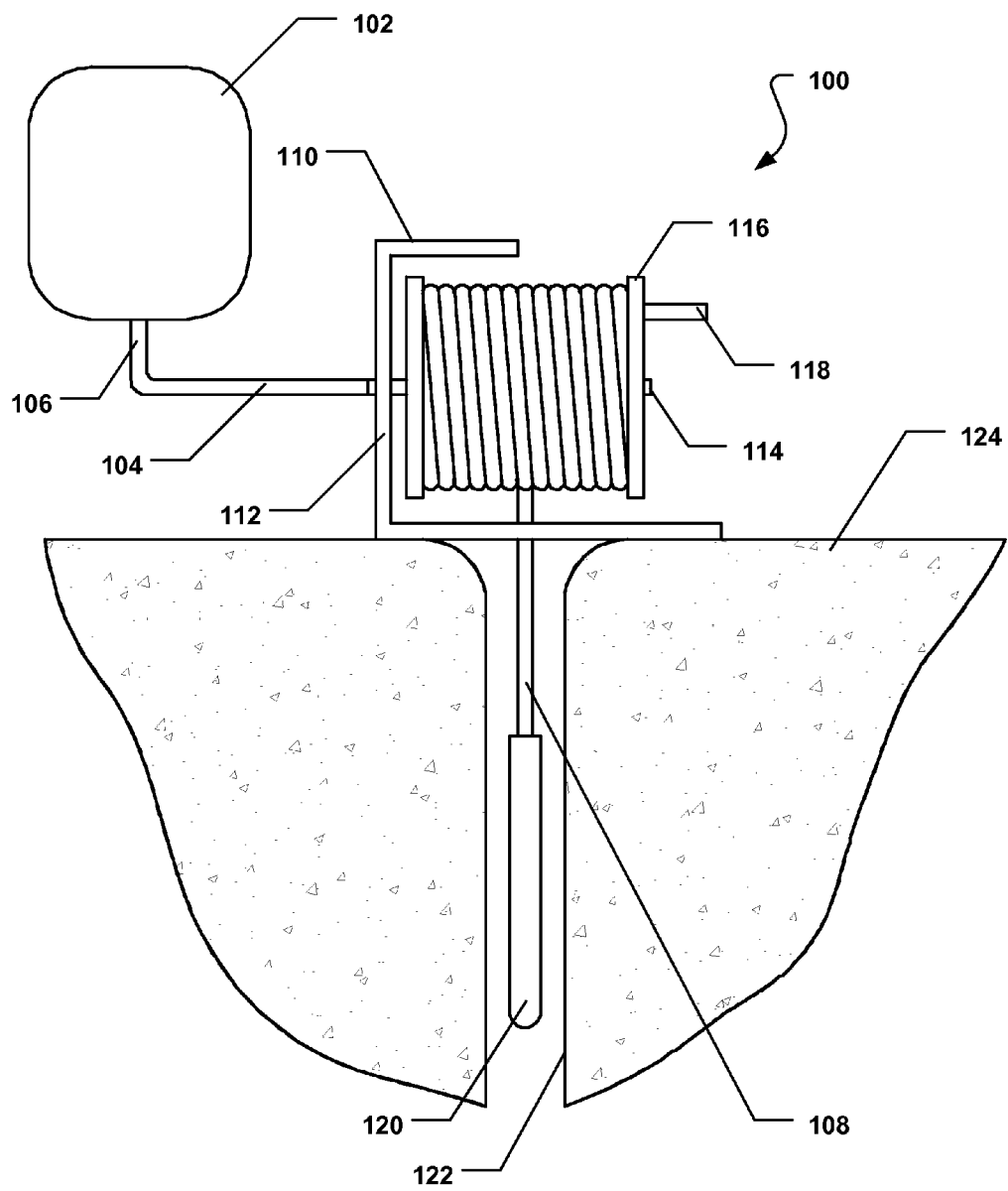
FIG. 1 includes a diagram of a well logging system in accordance with an embodiment.

Referring initially to FIG. 1, a well logging system is illustrated and is generally designated 100. As illustrated, the sell logging system 100 can include a control panel 102. Further, the well logging system 100 can include a signal cord 104 having a proximal end 106 and a distal end 108. As illustrated the proximal end 106 of the signal cord 104 can be connected to the control panel 102.

FIG. 1 indicates that the well logging system 100 can also include a spool assembly 110. The spool assembly 110 can include a stand 112. The stand 112 can include an axle 114 attached to the stand 112. Moreover, the spool assembly 110 can include a spool 116 installed on the axle 114. In a particular, the spool 116 can rotate within the stand 112 on the axle 114. Also, the spool 116 can include a handle 118 attached thereto. The handle 118 can allow a user to manually rotate the spool 116 within the stand 112.

As depicted in FIG. 1, a portion of the signal cord 104 can be wrapped around the spool 116. Accordingly, a user can rotate the spool 116 in a first direction in order to unwind the signal cord 104 from the spool 116, and the user can rotate the spool 116 in a second direction, opposite the first direction, in order to wind the signal cord 104 onto the spool 116.

FIG. 1 further illustrates that a sonde 120 can be connected to the distal end 108 of the signal cord 104. In general, the sonde 120 can be considered a probe that can include certain detection devices and associated electronics for exploring regions and environments that are unsuitable for humans. One such application can include exploratory drilling or well-logging applications in which a hole 122 can be drilled within the crust 124 of the earth in order to explore and characterize rock structures below the surface. Details concerning the sonde 120 and the associated components installed therein are described below in conjunction with FIG. 2 through FIG. 4.

Figure 2:
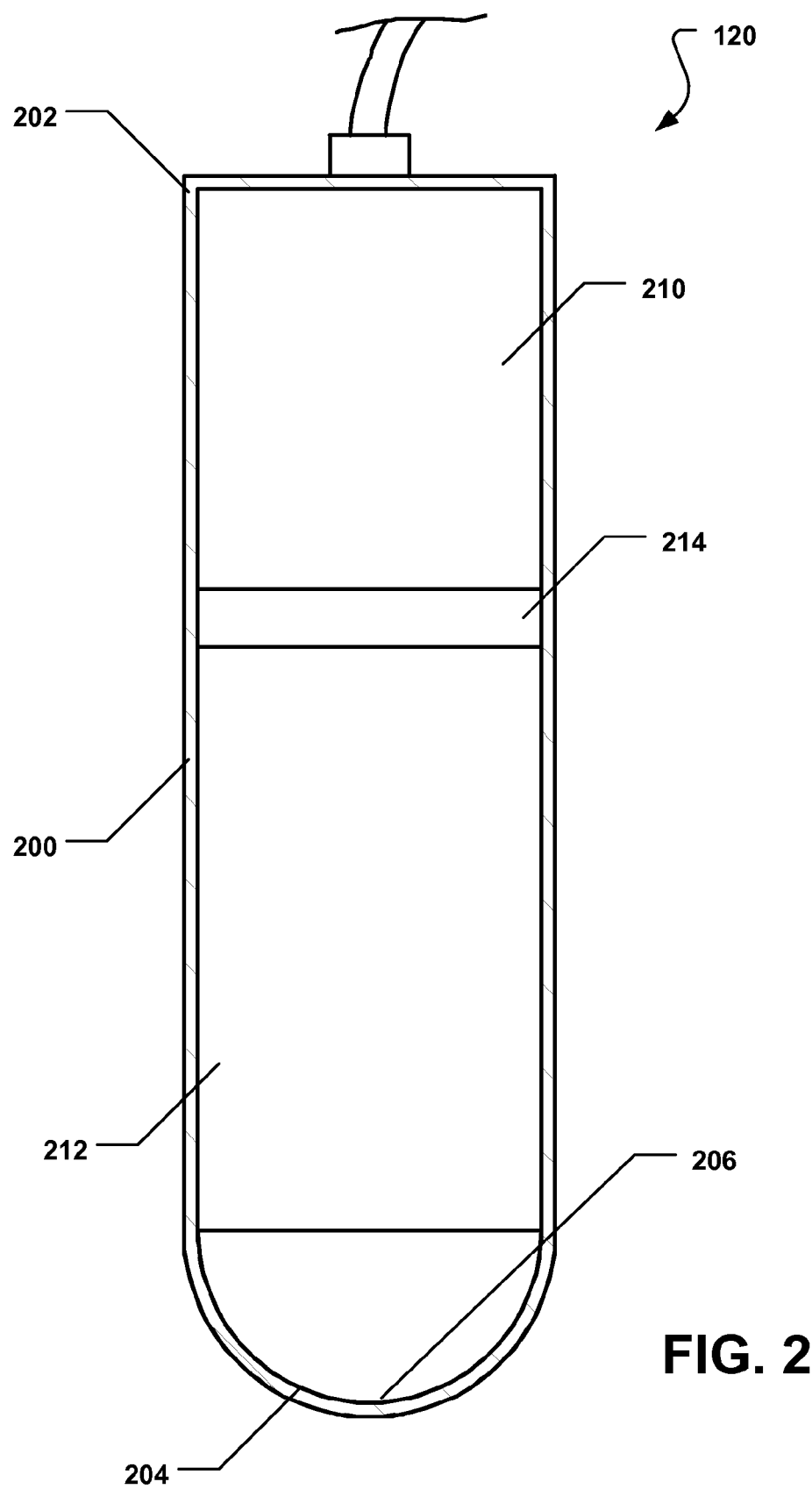
FIG. 2 includes a partial cross-sectional illustration of a sonde in accordance with an embodiment.

As depicted in FIG. 2, the sonde 120 can include a housing 200 having a proximal end 202 and a distal end 204. Further, the housing 200 can include an interior cavity 206. A photosensor 210 can be installed within the interior cavity 206 of the housing 200 at or near the proximal end 202 of the housing 200. A scintillation device 212 can be installed within the interior cavity 206 of the housing 200 at or near the distal end 204 of the housing 200. Moreover, as depicted in FIG. 2, a light pipe 214 can be installed within the interior cavity 206 of the housing 200 between the photosensor 210 and the scintillation device 212.

In a particular aspect, the photosensor 210 and the scintillation device 212 can be coupled to the light pipe 214 using known coupling methods such as the use of an optical gel or bonding agent. Further, the photosensor 210 can be coupled to the control panel 102 (FIG. 1) that includes the appropriate electronics adapted to count photons received at the photosensor 210 based on electrical pulses output by the photosensor 210. The electronics within the control panel 102 (FIG. 1), the photosensor 210, or a combination thereof can include one or more electronic devices, such as an amplifier, a pre-amplifier, a discriminator, an analog-to-digital signal converter, a photon counter, another electronic device, or any combination thereof.

In one embodiment, the photosensor 210 can include a device capable of spectral detection and resolution. For example, the photosensor 210 can include a conventional photomultiplier tube (PMT), a photodiode, or a hybrid photosensor. The photosensor 210 is adapted to receive photons emitted by the scintillation device 212, and the photosensor 210 produces electrical pulses from photons that it receives. The electrical pulses can be shaped and digitized by associated electronics to provide a count of the photons received at the photosensor 210. The photosensor 210 can be housed within a tube or housing made of a material capable of protecting electronics associated with the photosensor 210, such as a metal, metal alloy, other material, or any combination thereof.

As illustrated, the light pipe 214 can be disposed between the photosensor 210 and the scintillation device 212. The light pipe 214 can facilitate optical coupling between the photosensor 210 and the scintillation device 212. The light pipe 214 can include a quartz light pipe, plastic light pipe, or another light pipe. In some embodiments, multiple light pipes can be disposed between the photosensor 210 and the scintillation device 212.

Figure 3:
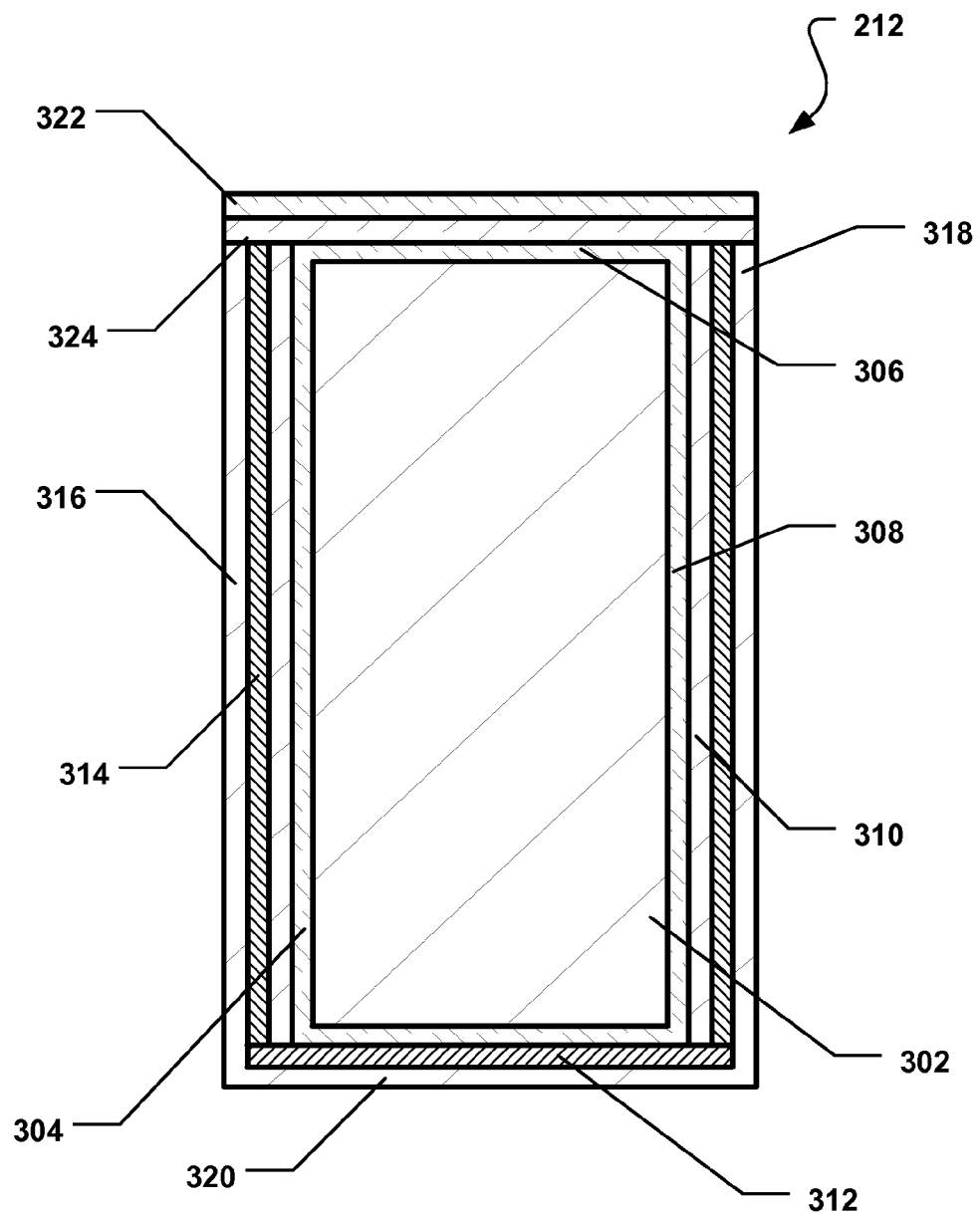
FIG. 3 includes a cross-sectional illustration of a first scintillation device in accordance with an embodiment.

Referring now to FIG. 3, details concerning the scintillation device 212 are illustrated. As illustrated, the scintillation device 212 can include a scintillator 302 that is completely surrounded by a pliable encapsulating barrier 304. The scintillator 302 can include a scintillator material. In a particular embodiment, the scintillator 302 can include a hygroscopic material.

In accordance with an embodiment, the scintillator material can be a material selected from the group of materials including inorganic materials, organic materials, and a combination thereof. In more particular instances, the scintillator material can be formed of inorganic materials including, for example, halides, oxides, and a combination thereof. In one particular instance, the scintillator material can be a crystalline, inorganic material. In fact, certain crystalline, inorganic materials can include rare-earth elements. Moreover, such inorganic materials can have a hexagonal crystal structure.

Embodiments herein can utilize a detector incorporating a scintillator material made of a crystalline inorganic material, such as CsF, NaI, LaCl$_3$, LaBr$_3$, BGO (e.g., Bi$_4$Ge$_3$O$_{12}$), CaF$_2$, LYSO (e.g., Lu$_{1.8}$Y$_{0.2}$SiO$_5$), LSO (e.g., Lu$_2$SiO$_5$), CsI, LuI$_3$, GSO (e.g., Gd$_2$SiO$_5$), CLYC (e.g., Cs$_2$LiYCl$_6$), CNLI (e.g., Cs$_2$NaLaI$_6$), CLLB (e.g., Cs$_2$LiLaBr$_6$), LuAO (e.g., LuAlO$_3$), LuYAO (e.g., Lu$_x$Y$_{1-x}$AlO$_3$), LuAO (e.g., Lu$_3$Al$_5$O$_{12}$), Lu$_2$Si$_2$O$_7$, GdI$_3$, SrI$_2$, LGSO (e.g., Lu$_{1.8}$Gd$_{0.2}$SiO$_5$) GYSO (e.g., GdYSiO$_5$), LGYSO and combinations thereof. Skilled artisans will appreciate that the foregoing crystalline, inorganic materials can include dopants, which can be present as elemental species in minor amounts within the compound.

In other embodiments, the scintillator material can include an organic material. For example, suitable organic materials can include polymer materials. In certain instances, the scintillator material can incorporate a combination of inorganic and organic materials, such as any of the organic materials utilized above in combination with a polymer material.

In a particular aspect, the pliable encapsulating barrier 304 can include an epoxy coating. The epoxy coating can be formed from a reaction of an epoxy resin and a hardener. The epoxy resin can include a liquid epoxy resin. Moreover, the liquid epoxy resin comprises an initial viscosity at 25° C. of at least about 0.25 Pa·s. In another aspect, the initial viscosity can be at least about 0.5 Pa·s, such as at least about 1.0 Pa·s, at least about 5.0 Pa·s, at least about 8.0 Pa·s, at least about 10.0 Pa·s, at least about 20.0 Pa·s, at least about 30.0 Pa·s, at least about 40.0 Pa·s, or at least about 50.0 Pa·s. In another aspect, the initial viscosity of the liquid epoxy resin can be not greater than about 60.0 Pa·s.

In another particular aspect, the epoxy coating can include a polyfunctional diol constituent. The polyfunctional diol constituent can be selected from the group consisting of a bisphenol A type diol constituent, a bisphenol F type diol constituent, a biphenyl type diol constituent, a phenol novolac type diol constituent, an orthocresol novolac type diol constituent, a dicyclopentadiene novolac type diol constituent, and a tris-hydroxyphenyl methane type diol constituent. Alternatively, the polyfunctional diol constituent can be selected from the group consisting of a spiro-ring-containing diol constituent and a glycidyl ether type diol constituent.

In another aspect, the polyfunctional diol constituent is selected from the group consisting of an alicyclic diol constituent, a heterocyclic diol constituent, a hydrogenated bisphenol A type diol constituent, and an aliphatic diol constituent. The heterocyclic diol constituent can be selected from the group consisting of a hydantoin diol constituent. The aliphatic diol constituent can be selected from the group consisting of a propylene glycol diglycidyl ether, a triglycidyl isocyanate diol constituent, and a pentaerythritol polyglycidyl ether diol constituent.

In still another particular aspect, the epoxy resin can include an epoxy resin that is obtained from a reaction between an alcohol and an epichlorohydrin. The alcohol can be selected from the group consisting of an aliphatic alcohol and an aromatic alcohol.

In a particular embodiment, the hardener can be selected from the group consisting of a crosslinking constituent, an aliphatic thio-constituent, an aliphatic dithio-constituent, an aromatic thio-constituent, an aromatic dithio-constituent, a heterocylic ring-containing thio constituent, a heterocylic ring-containing dithio constituent, and a thio constituent having at least two thio ether groups and sulfur.

The crosslinking constituent can include a halogen-containing compound. Further, the aliphatic dithio-constituent can be selected from the group consisting of a methanedithio-constituent, a propanedithio-constituent, cyclohexanedithio-constituent, a 2-mercaptoethyl-2,3-dimercaptosuccinate derivative, a 2,3-dimercapto-1-propanol(2-mercaptoacetate) derivative, a diethylene glycol bis(2-thioacetate) constituent, a 1,2-dithiopropyl methyl ether constituent, a bis(2-thioethyl) ether constituent, a trimethylolpropane tris(thioglycolate) derivative, a pentaerythritol tetra(mercaptopropionate) derivative, a pentaerythritol tetra(thioglycolate) derivative, a ethyleneglycol dithioglycolate constituent, a trimethylolpropane tris(beta-thiopropionate) derivative, a tris-mercaptan derivative of tri-glycidyl ether of propoxylated alkane, and a dipentaerythritol poly(beta-thiopropionate) derivative.

The aromatic thio constituent can be selected from the group consisting of a di-thiobenzene constituent, a tris-mercaptobenzene derivative, a tetra-mercaptobenzene derivative, a bis-(thioalkyl)benzene constituent, a tris-(mercaptoalkyl) benzene derivative, a tetra-(mercaptoalkyl)benzene derivative, a dithiobiphenyl constituent, a toluenedithio constituent, and a naphthalenedithio constituent.

The heterocylic ring-containing thio constituent can be selected from the group consisting of an amino-4,6-dithio-sym-triazine constituent, an alkoxy-4,6-dithio-sym-triazine constituent, an aryloxy-4,6-dithio-sym-triazine constituent, and a 1,3,5-tris(3-mercaptopropyl) isocyanurate derivative.

Moreover, the thio constituent compound having at least two thio ether groups and sulfur is selected from the group consisting of a bis-(thioalkylthio)benzene constituent, a tris-(mercaptoalkylthio)benzene derivative, a tetra-(mercaptoalkylthio)benzene derivative, a bis-(thioalkylthio)alkane constituent, a tris-(mercaptoalkylthio)alkane derivative, a tetra-(mercaptoalkylthio)alkane derivative, a bis(thioalkyl) disulfide constituent, a hydroxyalkylsulfidebis(thiopropionate) constituent, a hydroxyalkylsulfidebis(thioacetate) constituent, a mercaptoethyl ether bis(mercaptopropionate) derivative, a 1,4-dithian-2,5-diolbis(thioacetate) constituent, a thiodiglycolic acid bis(thioalkyl ester) constituent, a thiodipropionic acid bis(2-thioalkyl ester) constituent, a 4,4-thiobutyric acid bis(2-thioalkyl ester) constituent, a 3,4-thiophenedithio constituent, a bismuththiol, and 2,5-dithio-1, 3,4-thiadiazol constituent.

In another aspect, the hardener can be selected from the group consisting of an aliphatic amine, an aliphatic diamine, an aromatic amine, an aromatic diamine, and an heterocylic diamine. The aliphatic amine can be selected from an ethylene diamine, a propylene diamine, a tetramethylene diamine, a pentamethylene diamine, or a hexamethylene diamine, or derivatives thereof. In another embodiment, the aliphatic amine is trismethyl hexamethylene diamine.

It can be appreciated that the encapsulating barrier 304 can be substantially air tight. Further, the encapsulating barrier 304 can be substantially water tight. In another aspect, the encapsulating barrier 304 can include a hydrophobic material. In the instance that the scintillator 302 is hygroscopic, surrounding the scintillator 302 with a hydrophobic material may serve to further protect the scintillator 302.

In another particular aspect, the encapsulating barrier 304 can be optically transparent, or clear. For example, the encapsulating barrier can have a transparency of at least about 80% for a wavelength range from about 350 nm to about 700 nm. Moreover, the transparency is at least about 85%, such as at least about 90% or at least about 95%. In another aspect, the encapsulating barrier 304 has a refractive index of at least about 1.4. Further, the encapsulating barrier 304 is substantially non-yellowing so that as the encapsulating barrier 304 ages it remains optically transparent, or clear.

In another aspect, the encapsulating barrier 304 can have a thermal expansion coefficient greater than a thermal expansion coefficient of the scintillator. For example, the encapsulating barrier 304 has a thermal expansion coefficient of at least about $45*10^{-6} K^{-1}$. Moreover, the encapsulating barrier 304 has a thermal expansion coefficient of as at least about $50*10^{-6} K^{-1}$, such as at least about $55*10^{-6} K^{-1}$, at least about $60*10^{-6} K^{-1}$, or at least about $65*10^{-6} K^{-1}$.

In still another aspect, the encapsulating barrier 304 can have particular elongation that can defined by a percentage of an original dimension, such as length, that the encapsulating barrier 304 can stretch before the encapsulating barrier 304 tears, or otherwise fractures. For example, the encapsulating barrier 304 can have an elongation of at least about 50%. Further, the encapsulating barrier 304 can have an elongation of at least about 75%, such as at least about 85%, at least about 95%, at least about 100%, at least about 110%, or at least about 120%.

In another aspect, in order to maximize the sensitivity of the device in which the scintillator 302 having the encapsulating barrier 304 disposed there around is installed, the density of the material comprising the encapsulating barrier 304 can be less than about 1.5 g/cm$^3$. Further, the density can be less than about 1.25 g/cm$^3$, such as less than about 1.20 g/cm$^3$, less than about 1.15 g/cm$^3$, less than about 1.10 g/cm$^3$, less than about 1.08 g/cm$^3$, less than about 1.05 g/cm$^3$, less than about 1.03 g/cm$^3$, or less than about 1.0 g/cm$^3$.

In one embodiment, the encapsulating barrier 304 can include a substantially uniform thickness over the scintillator. The thickness can be at least about 0.1 mm. Further, the thickness can be at least about 0.25 mm, such as 0.5 mm, 1.0 mm, 2.0 mm, 3.0 mm, 4.0 mm, or 5.0 mm. However, the thickness can be not greater than about 10.0 mm without potentially interfering with the sensitivity of the device in which the scintillator 302 having the encapsulating barrier 304 disposed there around is installed.

In another embodiment, the encapsulating barrier 304 can include a window portion 306 having a first thickness and a body portion 308 having a second thickness. In this embodiment, the first thickness is different from the second thickness. For example, the second thickness can be greater than the first thickness. Specifically, a ratio of the second thickness to the first thickness may be at least about 1.25:1, at least about 1.5:1, at least about 1.75:1, at least about 2:1, at least about 3:1, or at least about 5:1. The ratio of the second thickness to the first thickness may not be greater than about 10:1.

As illustrated in FIG. 3, the scintillation device 212 can further include a first reflector 310 at least partially surrounding the encapsulating barrier 304. For example, the first reflector 310 can be disposed around an outer periphery of the encapsulating barrier 304. Further, a second reflector 312 can be placed at or near an end of the encapsulating barrier 304.

In one embodiment, the first reflector 310, the second reflector 312, or a combination thereof can be substantially surrounded by a liner (not illustrated) disposed around or on an outer surface of each reflector 310, 312, which can include a metal material, particularly a thin metal liner such as a foil. In accordance with a particular embodiment, the coating material can include aluminum foil. In other embodiments, the reflector 310, 312 can consist essentially of the liner, such that each reflector 310, 312 is a thin metal foil.

In accordance with a particular embodiment, the reflector 310, 312 can be a preformed sheet containing a polymer material. Some suitable polymer materials can include fluorinated polymers. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylele, ethylene-chlorotrifluoroethylene, and mixtures of such fluoropolymers. In one particular embodiment, each reflector 310, 312 can consist essentially of a fluorinated polymer. In a more particular embodiment, each reflector 310, 312 can be made mostly, or entirely, of polytetrafluoroethylene (PTFE).

Still referring to FIG. 3, the scintillation device 212 can further include a shock absorbing member 314 that can at least partially surround the first reflector 310 and the elements within the first reflector 310, e.g., the scintillator 302 and the encapsulating barrier 304. The shock absorbing member 314 can be generally cylindrical and can be made from a polymeric material. A housing 316 having an open end 318 and a closed end 320 can surround the shock absorbing member 314. In a particular aspect, the shock absorbing member 314 can protect the elements within the shock absorbing member 314 from impacting the housing 316. Further, the shock absorbing member 314 can substantially reduce vibration within the housing 316.

FIG. 3 illustrates that a window 322 can be affixed, or otherwise attached, to the open end 318 of the housing 316 via an optical interface 324. In a particular aspect, the optical interface 324 is substantially transparent. For example, the optical interface 324 can comprise clear silicone rubber.

In the embodiment illustrated in FIG. 3, the encapsulating barrier 304 completely surrounds the scintillator 302. Further, in a particular aspect, the encapsulating barrier 304 can be applied to the scintillator 302 using a coating process. For example, the encapsulating barrier 304 can be applied to the scintillator 302 using a dip coating process, a brush coating process, a spray coating process, a chemical vapor deposition process, a physical vapor deposition process, or a combination thereof. Also, the encapsulating barrier 304 can be molded around the scintillator 302.

Figure 4:
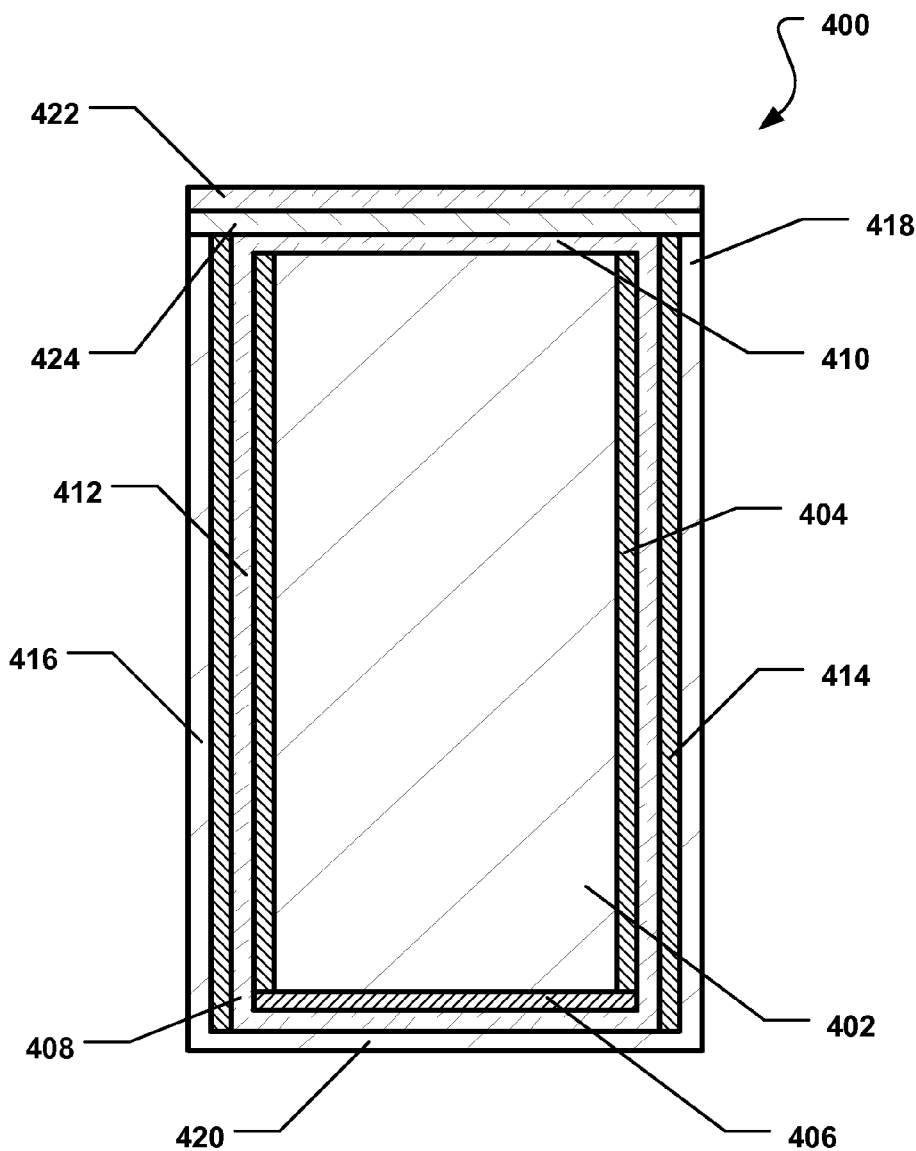
FIG. 4 includes a cross-sectional illustration of a second scintillation device in accordance with an embodiment.

Referring now to FIG. 4, a second scintillation device, generally designated 400, is illustrated. It can be appreciated that second scintillation device 400 can also be installed within the sonde 120 (FIG. 1 and FIG. 2), in lieu of the first scintillation device 212 (FIG. 2 and FIG. 3).

As described in greater detail below, the second scintillation device 400 includes a pliable encapsulating barrier can completely surround a scintillator/reflector combination. Specifically, the reflectors can at least partially surround the scintillator and the encapsulating barrier can surround the reflectors and the scintillator. As such, the encapsulating barrier can protect the scintillator and the reflectors, e.g., from water damage, vibration, etc.

As illustrated in FIG. 4, the second scintillation device 400 can include a scintillator 402. A first reflector 404 can at least partially surround the scintillator 402. For example, the first reflector 404 can be disposed around an outer periphery of the scintillator 402. As depicted in FIG. 4, a second reflector 406 can be placed at or near an end of the scintillator 402.

In a particular aspect, the scintillator 402 can include one or more of the scintillators materials described herein in conjunction with the first scintillation device 212 (FIG. 2 and FIG. 3). The first reflector 404, the second reflector 406, or a combination thereof can be substantially surrounded by a liner (not illustrated) disposed around or on an outer surface of each reflector 404, 406, which can include a metal material, particularly a thin metal liner such as a foil. In accordance with a particular embodiment, the coating material can include aluminum foil. In other embodiments, the reflector 404, 406 can consist essentially of the liner, such that each reflector 404, 406 is a thin metal foil. In another particular embodiment, the reflector 404, 406 can be made from one or more of the materials described herein in conjunction with the first scintillation device 212 (FIG. 2 and FIG. 3).

Still referring to FIG. 4, the reflectors 404, 406 and the scintillator 402 can be completely surrounded by a pliable encapsulating barrier 408. The pliable encapsulating barrier 408 can be made from one or more of the materials described herein in conjunction with the encapsulating barrier 304 (FIG. 3) of the first scintillation device 212 (FIG. 2 and FIG. 3). Moreover, the pliable encapsulating barrier 408 can comprise one or more of the mechanical or physical properties described in conjunction with the encapsulating barrier 304 (FIG. 3) of the first scintillation device 212 (FIG. 2 and FIG. 3). Also, the pliable encapsulating barrier 408 can be applied to the reflectors 404, 406 using one or more the coating processes described herein in conjunction with the first scintillation device 212 (FIG. 2 and FIG. 3).

In one embodiment, the encapsulating barrier 408 can include a substantially uniform thickness over the scintillator. The thickness can be at least one millimeter, such as at least two millimeters, at least three millimeters, at least four millimeters, at least five millimeters, at least six millimeters, at least seven millimeters, at least eight millimeters, or at least nine millimeters. However, the thickness can be not greater than ten millimeters.

In another embodiment, the encapsulating barrier 408 can include a window portion 410 having a first thickness and a body portion 412 having a second thickness. In this embodiment, the first thickness is different from the second thickness. For example, the second thickness can be greater than the first thickness.

As illustrated in FIG. 4, the scintillation device 400 can further include a shock absorbing member 414 that can at least partially surround the encapsulating barrier 408 and the elements within the encapsulating barrier 408, e.g., the first reflector 404, the second reflector 406, and the scintillator 402. In one aspect, the shock absorbing member 414 can be generally cylindrical and can be made from a polymeric material. A housing 416 having an open end 418 and a closed end 420 can surround the shock absorbing member 414. In a particular aspect, the shock absorbing member 414 can protect the elements within the shock absorbing member 414 from impacting the housing 416. Further, the shock absorbing member 414 can substantially reduce vibration within the housing 416.

FIG. 4 further illustrates that a window 422 can be affixed, or otherwise attached, to the open end 418 of the housing 416 via an optical interface 424. In a particular aspect, the optical interface 424 is substantially transparent. For example, the optical interface 424 can comprise clear silicone rubber.

Figure 5:
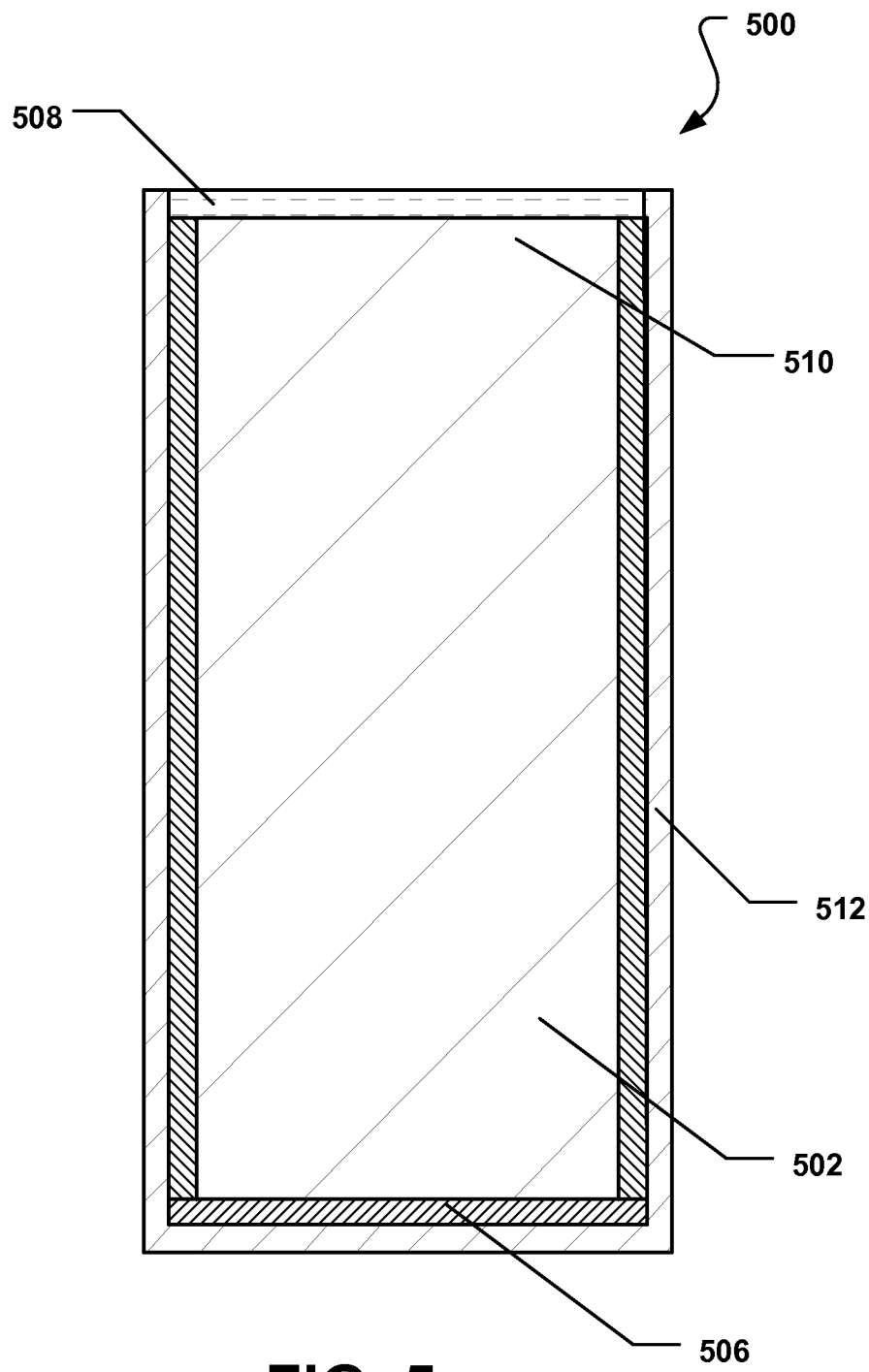
FIG. 5 includes a cross-sectional illustration of a third scintillation device in accordance with an embodiment.

Referring FIG. 5, a third scintillation device is illustrated and is generally designated 500. It can be appreciated that third scintillation device 500 can also be installed within the sonde 120 (FIG. 1 and FIG. 2), in lieu of the other scintillation devices. Or, the scintillation device 500 can be used as a scintillator only detector to which a photosensor can be attached, e.g., to a window.

As illustrated in FIG. 5, the third scintillation device 500 can include a scintillator 502. A first reflector 504 can at least partially surround the scintillator 502. For example, the first reflector 504 can be disposed around an outer periphery of the scintillator 502. As depicted in FIG. 5, a second reflector 506 can be placed at or near an end of the scintillator 502. The second reflector 506 and the first reflector 504 can be formed as a single unit.

In a particular aspect, the scintillator 502 can include one or more of the scintillators materials described herein. The first reflector 504 and the second reflector 506 can include one or more of the reflector materials described herein. Further, the reflectors 504, 506 can include PTFE, quartz cloth, or a white coated metal (e.g., $TiO_2$ powder coated metal.)

Still referring to FIG. 5, a window 508 can be placed at an open end 510 of the scintillator 502, e.g., the end without the second reflector 506. Thereafter, the reflectors 504, 508, the scintillator 502, and the sides of the window 508 can be completely surrounded by a pliable encapsulating barrier 512. The pliable encapsulating barrier 512 can be made from one or more of the materials described herein. Further, the encapsulating barrier 512 can hermetically seal the window 508. In a particular aspect, the encapsulating barrier 512 can only contact the side surfaces of the window 508.

Skill artisans can appreciate that the sonde 120 illustrated in FIG. 1 and FIG. 2 can be used in a subterranean environment, e.g., for well logging. The encapsulating barrier 304, 408, 512 of each scintillation device 212, 400, 500 can substantially prevent damage to the scintillation materials installed therein due to exposure to water, water vapor, or a combination thereof. Further, the encapsulating barrier 304, 408, 512 either alone, or in conjunction with the shock absorbing member 314, 414, can also substantially reduce damage to the scintillation materials due to shock impacts with the interior of the housing 316, 416. Also, the encapsulating barrier 304, 408, 512 either alone, or in conjunction with the shock absorbing member 314, 414 can substantially reduce signal issues due to vibration of the sonde 120 in which each scintillation device 212, 400, 500 can be installed.

Although each scintillation device 212, 400, 500 can be installed in a well logging sonde 120 as indicated in FIG. 2, skill artisans can appreciate that the scintillation devices 212, 400, 500 can be used in other detectors in which exposure to water is possible. For example, the scintillation devices 212, 400, 500 can be used in other outdoor environments such as within port-of-entry detectors. Further, the scintillation devices 212, 400, 500 can be used as handheld radiation probes. The encapsulating barriers 302, 408, 512 within the scintillation devices 212, 400, 500 can protect components therein from temperature gradients, humidity, bumping, vibration, etc.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract is submitted with the understanding that it will not be used to interpret or limit the scope or meaning of the claims. In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

what is claimed is:

1. A detector device, comprising:
   a photosensor; and
   a scintillation device adjacent to the photosensor, wherein the scintillation device comprises:
      a scintillator; and
      a pliable encapsulating barrier completely surrounding the scintillator, wherein the pliable encapsulating barrier comprises an epoxy coating.

2. The detector device of claim 1, wherein the scintillator comprises a scintillation material including CsF, NaI, LaCl$_3$, LaBr$_3$, CaF$_2$, CsI, LuI$_3$, Cs$_2$NaLaI$_6$, or SrI$_2$.

3. The detector device of claim 1, wherein the epoxy coating is formed from a reaction of an epoxy resin and a hardener.

4. The detector device of claim 3, wherein the hardener is selected from the group consisting of a crosslinking constituent, an aliphatic thio-constituent, an aliphatic dithio-constituent, an aromatic thio-constituent, an aromatic dithio-constituent, a heterocylic ring-containing thio constituent, a heterocylic ring-containing dithio constituent, and a thio constituent having at least two thio ether groups and sulfur.

5. The detector device of claim 4, wherein the crosslinking constituent comprises a halogen-containing compound.

6. The detector device of claim 4, wherein the aliphatic dithio-constituent is selected from the group consisting of a methanedithio-constituent, a propanedithio-constituent, cyclohexanedithio-constituent, a 2-mercaptoethyl-2,3-dimercaptosuccinate derivative, a 2,3-dimercapto-1-propanol(2-mercaptoacetate) derivative, a diethylene glycol bis(2-thioacetate) constituent, a 1,2-dithiopropyl methyl ether constituent, a bis(2-thioethyl)ether constituent, a trimethylolpropane tris(thioglycolate) derivative, a pentaerythritol tetra(mercaptopropionate) derivative, a pentaerythritol tetra(thioglycolate) derivative, a ethyleneglycol dithioglycolate constituent, a trimethylolpropane tris(beta-thiopropionate) derivative, a tris-mercaptan derivative of tri-glycidyl ether of propoxylated alkane, and a dipentaerythritol poly(beta-thiopropionate) derivative.

7. The detector device of claim 4, wherein the aromatic thio constituent is selected from the group consisting of a dithiobenzene constituent, a tris-mercaptobenzene derivative, a tetra-mercaptobenzene derivative, a bis-(thioalkyl)benzene constituent, a tris-(mercaptoalkyl)benzene derivative, a tetra-(mercaptoalkyl)benzene derivative, a dithiobiphenyl constituent, a toluenedithio constituent, and a naphthalenedithio constituent.

8. The detector device of claim 4, wherein the heterocylic ring-containing thio constituent is selected from the group consisting of an amino-4,6-dithio-sym-triazine constituent, an alkoxy-4,6-dithio-sym-triazine constituent, an aryloxy-4,6-dithio-sym-triazine constituent, and a 1,3,5-tris(3-mercaptopropyl) isocyanurate derivative.

9. The detector device of claim 4, wherein the thio constituent compound having at least two thio ether groups and sulfur is selected from the group consisting of a bis-(thioalkylthio)benzene constituent, a tris-(mercaptoalkylthio)benzene derivative, a tetra-mercaptoalkylthio)benzene derivative, a bis-(thioalkylthio)alkane constituent, a tris-(mercaptoalkylthio)alkane derivative, a tetra-(mercaptoalkylthio)alkane derivative, a bis(thioalkyl) disulfide constituent, a hydroxyalkylsulfidebis(thiopropionate) constituent, a hydroxyalkylsulfidebis(thioacetate) constituent, a mercaptoethyl ether bis(mercaptopropionate) derivative, a 1,4-dithian-2,5-diolbis(thioacetate) constituent, a thiodiglycolic acid bis(thioalkyl ester) constituent, a thiodipropionic acid bis(2-thioalkyl ester) constituent, a 4,4-thiobutyric acid bis(2-thioalkyl ester) constituent, a 3,4-thiophenedithio constituent, a bismuth-thiol, and 2,5-dithio-1,3,4-thiadiazol constituent.

10. The detector device of claim 3, wherein the hardener is selected from the group consisting of an aliphatic amine, an aliphatic diamine, an aromatic amine, an aromatic diamine, and a heterocylic diamine.

11. The detector device of claim 1, wherein the epoxy coating comprises a polyfunctional diol constituent.

12. The detector device of claim 11, wherein the polyfunctional diol constituent is selected from the group consisting of a bisphenol A type diol constituent, a bisphenol F type diol constituent, a biphenyl type diol constituent, a phenol novolac type diol constituent, an orthocresol novolac type diol constituent, a dicyclopentadiene novolac type diol constituent, and a tris-hydroxyphenyl methane type diol constituent.

13. The detector device of claim 11, wherein the polyfunctional diol constituent is selected from the group consisting of an alicyclic diol constituent, a heterocyclic diol constituent, an hydrogenated bisphenol A type diol constituent, and an aliphatic diol constituent.

14. The detector device of claim 13, wherein the heterocyclic diol comprises a hydantoin diol constituent.

15. The detector device of claim 13, wherein the aliphatic diol constituent is selected from the group consisting of a propylene glycol diglycidyl ether, a triglycidyl isocyanate diol constituent, and a pentaerythritol polyglycidyl ether diol constituent.

16. The detector device of claim 11, wherein the polyfunctional diol constituent is selected from the group consisting of a spiro-ring-containing diol constituent and a glycidyl ether type diol constituent.

17. The detector device of claim 1, wherein the dectector device is at least part of a sonde used in a well logging system.

18. A scintillator device comprising:
 a scintillator;
 a reflector at least partially surrounding the scintillator; and
 an optically transparent encapsulating barrier completely surrounding all sides of a combination of the scintillator and the reflector.

19. A detector device, comprising:
 a scintillator;
 a reflector surrounding the scintillator wherein an end of the scintillator is not covered by reflector material;
 a window disposed on the end of the scintillator that is not covered by the reflector material; and
 an optically transparent encapsulating barrier completely surrounding a combination of the scintillator, the reflector, and side surfaces of the window.

20. The detector device of calim 19, wherein the dectector device is at least part of a Sonde used in well logging system.

* * * * *